United States Patent [19]
Philpott et al.

[11] 3,842,685
[45] Oct. 22, 1974

[54] TRANSMISSION UNIT

[76] Inventors: Arthur Philpott, Ferndale, Whittaker Ln., Little Eaton; Reginald Samuel Fuher, 7 Boulton Dr., Alvaston, both of England

[22] Filed: Feb. 5, 1974

[21] Appl. No.: 440,060

Related U.S. Application Data
[63] Continuation-in-part of Ser. No. 295,950, Oct. 10, 1972, abandoned.

[30] Foreign Application Priority Data
Oct. 9, 1971  Great Britain ................... 47123/71

[52] U.S. Cl. ............. 74/217 C, 74/750 R, 74/781 R
[51] Int. Cl. ........ F16h 9/04, F16h 3/52, F16h 3/44
[58] Field of Search ........... 74/781, 750, 217 C, 219

[56] References Cited
UNITED STATES PATENTS
1,695,214  12/1928  Sörensen ........................ 74/750 R
3,031,025  4/1962  Hilmer et al. .................... 74/781 R

*Primary Examiner*—Leonard H. Gerin
*Attorney, Agent, or Firm*—Larson, Taylor & Hinds

[57] ABSTRACT

A transmission unit having an input shaft and an output shaft in co-axial alignment and being capable of infinitely varying the speed of rotation of the output shaft from a predetermined maximum speed of rotation to zero or vice versa, in relation to a given speed of rotation of the input shaft. The transmission unit is constructed using sprocket wheels and chains instead of intermeshing gears.

19 Claims, 8 Drawing Figures

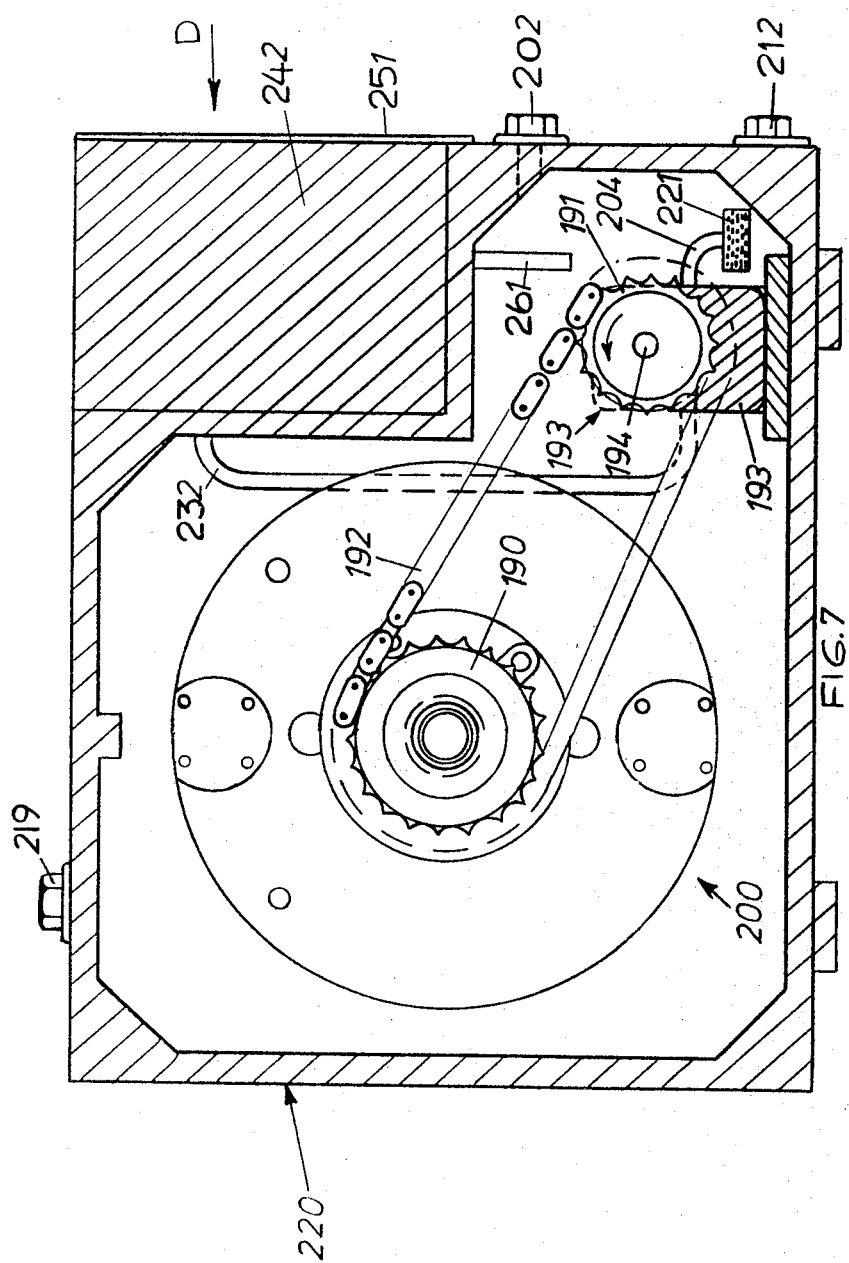

TRANSMISSION UNIT

CROSS-REFERENCE TO RELATED APPLICATIONS

This application is a continuation-in-part application to U.S. application, Ser. No. 295,950, now abandoned, dated Oct. 10, 1972.

The present invention relates to transmission units, and more particularly to transmission units having an infinitely variable output.

In some transmission units it is desirable to construct such units from a series of sprocket wheels and chains rather than intermeshing gears. The primary advantages of using chains and sprocket wheels are that with chains and sprocket wheels the cost of construction is cheaper than with intermeshing gears and that it is fairly easy task to interchange the sprocket wheels in an existing unit to change the performance characteristics of the unit, e.g., ratio of input to output.

Heretofore difficulties having been encountered in using a plurality of sprocket wheels fixedly mounted on the same shaft each sprocket wheel co-operating with a respective chain since it is essential with chain and sprocket wheel assemblies for the sprockets to be precisely co-ordinated with their respective chains during use.

It is therefore an object of the present invention to provide a transmission unit including a system of sprocket wheels and chains.

A further object of the present invention is to provide a transmission unit having an input shaft, an output shaft in co-axial alignment with the input shaft, a sprocket wheel carrying member secured to the input shaft and extending generally radially therefrom, a first sprocket wheel co-axially mounted on the output shaft, at least one drive sprocket wheel assembly mounted on the sprocket wheel carrying member, each drive sprocket wheel assembly at least including a primary and a secondary sprocket wheel, at least one drive sprocket assembly in which the primary and secondary sprocket wheels are adapted to be releasably locked in a desired rotational position relative to one another, a chain extending about the first sprocket wheel and the primary sprocket wheel of the or each individual drive sprocket wheel assembly, a second sprocket wheel rotatably received on the output shaft, a further chain extending about the second sprocket wheel and the seocondary sprocket wheel of the or each individual drive sprocket wheel assembly, and means for controlling the speed of rotation of said second sprocket wheel to control the speed of rotation of said output shaft.

In accordance with another object the second sprocket wheel is secured to a sleeve rotatably received on the output shaft and means are provided for controlling the speed of rotation of the sleeve to control the speed of rotation of the output shaft, for instance the sleeve may be adapted to drive a hydraulic pump, the fluid outlet of which having valve means for suitably controlling the fluid output of the pump to control the speed of rotation of the sleeve.

Advantageously, two drive sprocket wheel assemblies are provided in a diametrically opposed relationship about the axis of rotation of the output shaft, and one of the two drive sprocket wheel assemblies is adapted so that the primary and the secondary wheels may be releasibly locked in a desired rotational position relative to one another.

It is yet a further object of the present invention to provide at least one drive sprocket wheel assembly comprising a tubular portion onto which is co-axially secured the primary or the secondary sprocket wheel, a sleeve portion which is capable of receiving the tubular portion, the sleeve portion co-axially carrying the secondary or primary sprocket wheel and clamping means operable to deform said sleeve to grip the tubular portion and so lock the primary sprocket wheel and the secondary sprocket wheel in a desired rotational position to one another.

Preferred embodiments according to the invention are hereinafter described with reference to the accompanying drawings in which:

FIG. 7 is a cross-sectional view of a transmission unit of the present invention located in a housing and provided with hydraulic control means as illustrated in FIG. 6;

Figure 1:
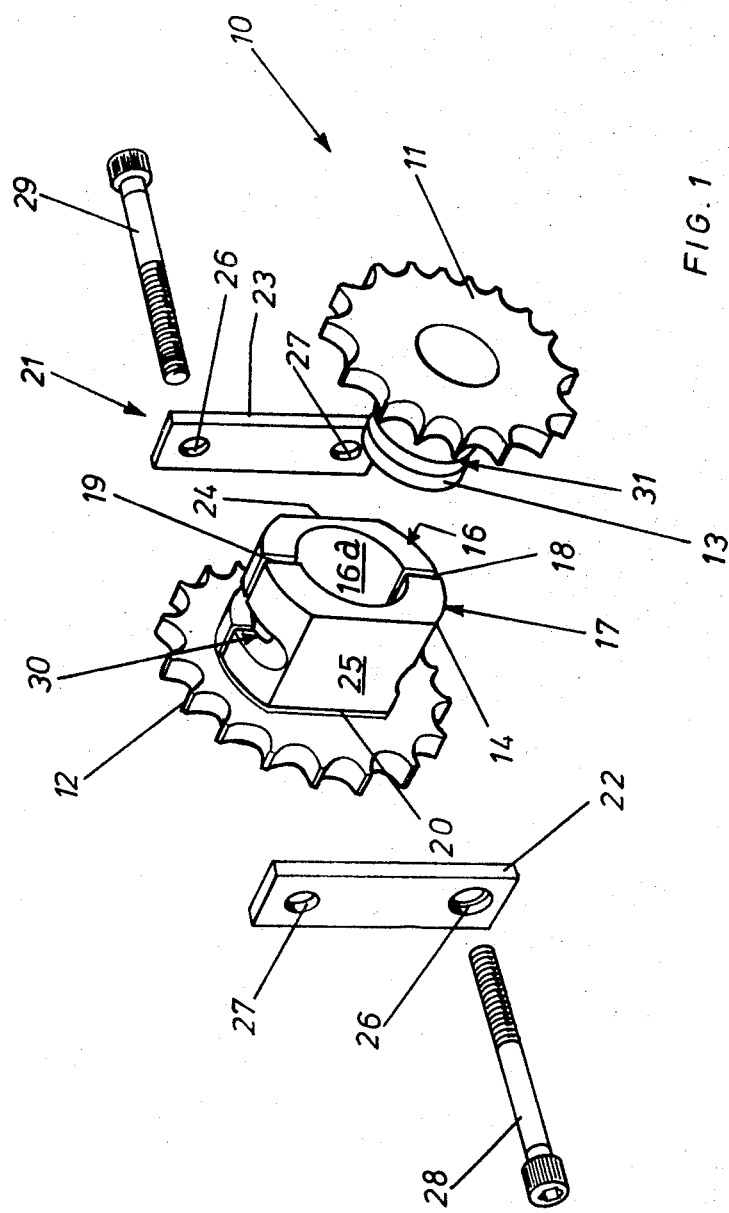
FIG. 1 is an exploded perspective view of an adjustable drive sprocket wheel assembly according to the present invention.

With reference to the accompanying drawings, in particular FIG. 1, an adjustable drive sprocket wheel assembly is generally shown at 10. The assembly 10 includes a primary sprocket wheel 11 and a secondary sprocket wheel 12.

The primary sprocket wheel 11 is provided with a tubular portion 13, the longitudinal axis of which is co-axial with the axis of rotation of the sprocket wheel 11.

The secondary sprocket wheel 12 is provided with a sleeve portion 14, the longitudinal axis of which is co-axial with the axis of rotation of the secondary sprocket wheel 12. The sleeve portion 14 has a bore 16a which is capable of receiving the tubular portion 13 of the primary sprocket wheel 11. The sleeve portion 14 is divided into parts 16 and 17 by two longitudinally extending slots 18 and 19. Each part 16 and 17 has an associated partially circumferentially extending slot 20 (only the slot associated with part 16 being shown). Clamping means 21 are provided which engage sleeve portion 14 and are operable to move sleeve parts 16 and 17 towards one another to grip tubular portion 13 and prevent relative rotation between the primary sprocket wheel 11 and the secondary sprocket wheel 12. The clamping means 21 comprise two plates 22 and 23 each plate bearing against an associated flat portion 24, 25 formed on respective sleeve parts 16 and 17. Each plate 22, 23 is provided at one end with an aperture 26 and an internally threaded aperture 27 at the opposite end. Two bolts 28 and 29 are provided each of which slidably extends through the aperture 26 of one plate and is threadedly received in the threaded apertures 27 of the other plate. Thus by rotation of bolts 28 and 29, plates 22 and 23 are moved towards or away from sleeve parts 16 and 17 to clamp or release tubular portion 13 of the primary sprocket wheel.

The bolts 28 and 29 are received in tangentially extending recesses 30 formed in the sleeve portion 14 and also extend into a circumferentially extending channel 31 formed in the tubular portion 13 so that when the drive sprocket wheel assembly 10 is in its assembled state, the tubular portion 13 is prevent from being axially withdrawn from the sleeve portion 14 and even when the clamping means 21 is in a release position.

Figure 2:
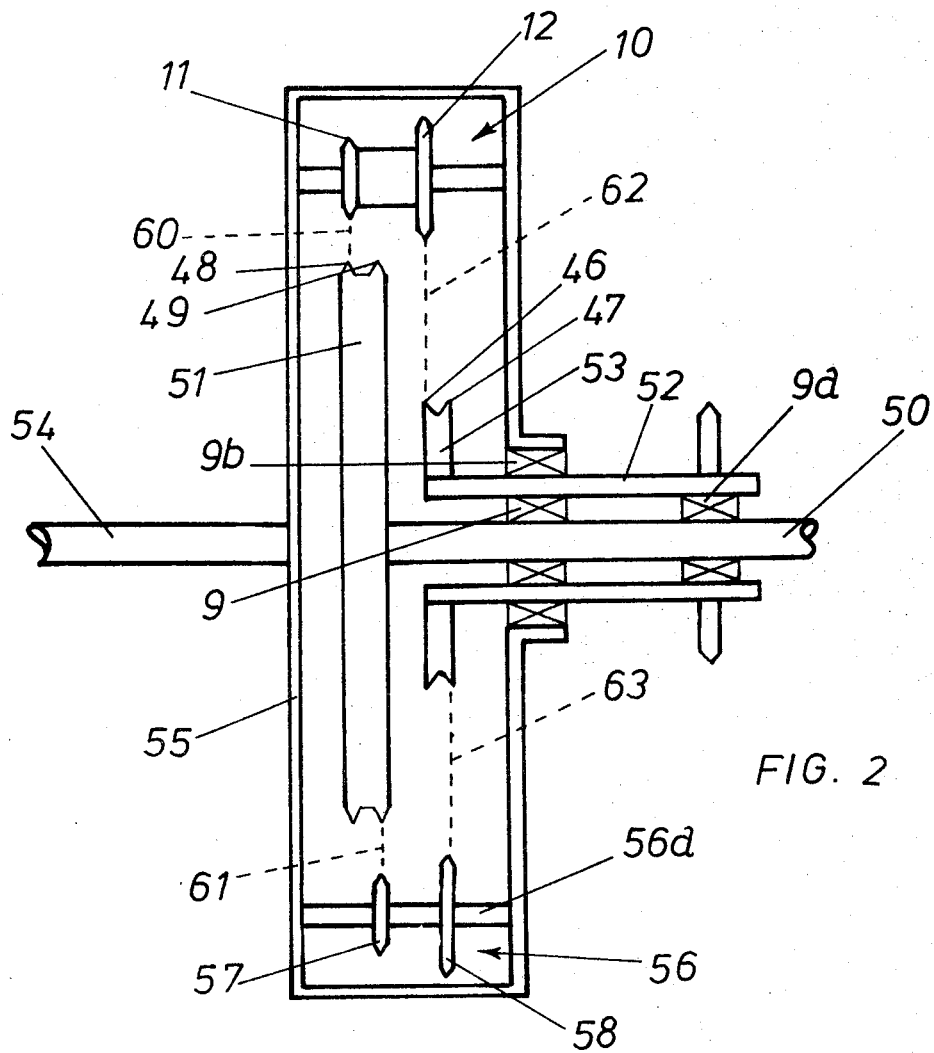
FIG. 2 is a broken away side elevational view of transmission unit having an adjustable drive sprocket wheel according to the present invention.
Figure 3:
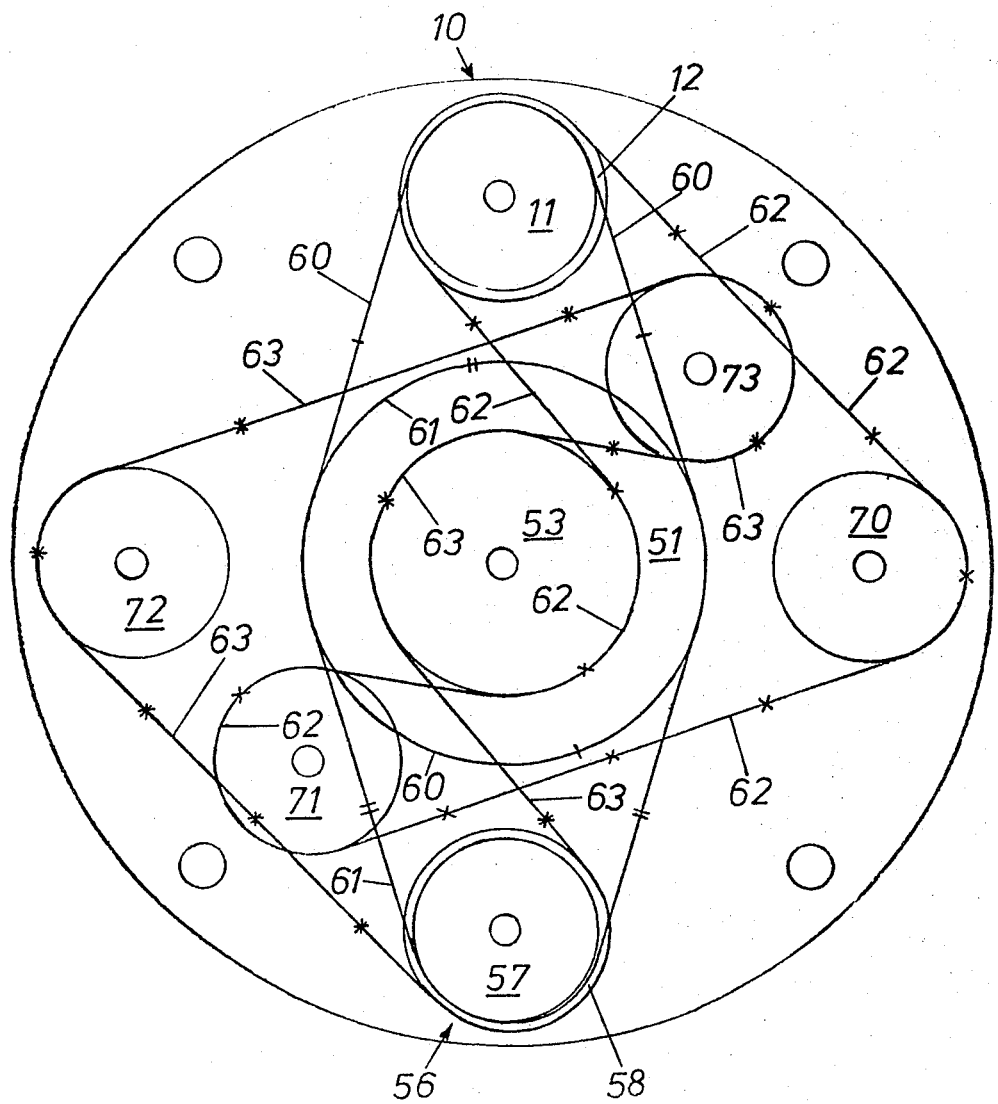
FIG. 3 is a broken away end view of FIG. 2 showing the layout of the sprocket wheels and interconnecting chains.

With reference to FIGS. 2 and 3, and particularly FIG. 2, there is shown an output shaft 50, a first sprocket wheel 51 secured to the output shaft and having two rows of teeth 48, 49, a sleeve 52 rotatably located on output shaft 50 by bearing races 9, 9a, a second sprocket wheel 53 having two rows of teeth 46, 47 secured to the sleeve 52, an input shaft 54 coaxially aligned with the output shaft 50 and the drive sprocket wheel carrying member 55 attached to the input shaft 54 and rotatably located on the sleeve 52 by bearing races 9b.

The carrying member 55 rotatably carries an adjustable drive sprocket wheel assembly 20 and a drive sprocket wheel assembly 56 in which the primary and secondary sprocket wheels are fixably secured on the same shaft 56a. A chain 60 extends about the primary sprocket wheel 11 of sprocket assembly 10 and teeth 48 of the first sprocket wheel 51 and a chain 61 extends about the primary sprocket wheel 57 of the sprocket assembly 56 and teeth 49 of the first sprocket wheel 51. A chain 62 extends about the secondary sprocket wheel 12 of the sprocket assembly 10 and teeth 46 of second sprocket wheel 53 and a chain 63 extends about the secondary sprocket wheel 58 of the sprocket assembly 56 and teeth 47 of the second sprocket wheel 53.

As is clearly shown in FIG. 3, four further sprocket wheels 70, 71, 72 and 73 are provided, chain 62 further extending around sprocket wheels 70 and 71 and chain 63 further extending around sprocket wheel 72 and 73. The further sprocket wheels 70 to 73 serve to provide for a large amount of wrap of chains 62 and 63 about the second sprocket wheel 53.

The shafts (not shown) which carry sprocket wheels 70 and 72 are carried in slides in the carrying member 55 so that tension in chains 62 and 63 may be adjusted. Also, the shafts (not shown) carrying the drive sprocket assemblies 10, 56, are carried in circular plates rotatably housed in the carrying member 55, the shafts being received in the circular plates at an off-centre position so that rotation of the circular plates causes an eccentric movement of the shafts, by which movement the tension in the chains 60, 61, 62 and 63 may be adjusted.

Once the above transmission unit has been assembled, the tensions in chains 60, 61, 62 and 63 are suitably adjusted and clamping means 21 of sprocket assembly 10 is in a release position permitting relative rotation of the primary sprocket 11 and secondary sprocket 12. The input shaft is rotated and the relative rotational position of the primary and secondary sprocket 11 and 12 respectively are automatically adjusted so that the respective sprocket teeth are so positioned to co-ordinate with chains 60 and 62 respectively. The clamping means 21 is then actuated to grip the portion 14 and so prevent relative rotation between the primary sprocket 11 and secondary sprocket 12.

It is to be noted that drive sprocket assembly 56 may also be an adjustable drive sprocket assembly similar to assembly 10.

The gearing ratio between input and output when the sleeve 55 is stationary is completely dependant on the size of the drive sprocket assemblies and first and second sprocket wheels. For instance, for a step up of 1 to 1.75 the primary sprocket wheels 11 and 57 have 17 teeth, the secondary sprocket wheels 12 and 58 have 19 teeth, and the first sprocket wheel has 38 teeth in each row and the second sprocket wheel has 25 teeth in each row.

Figure 4:
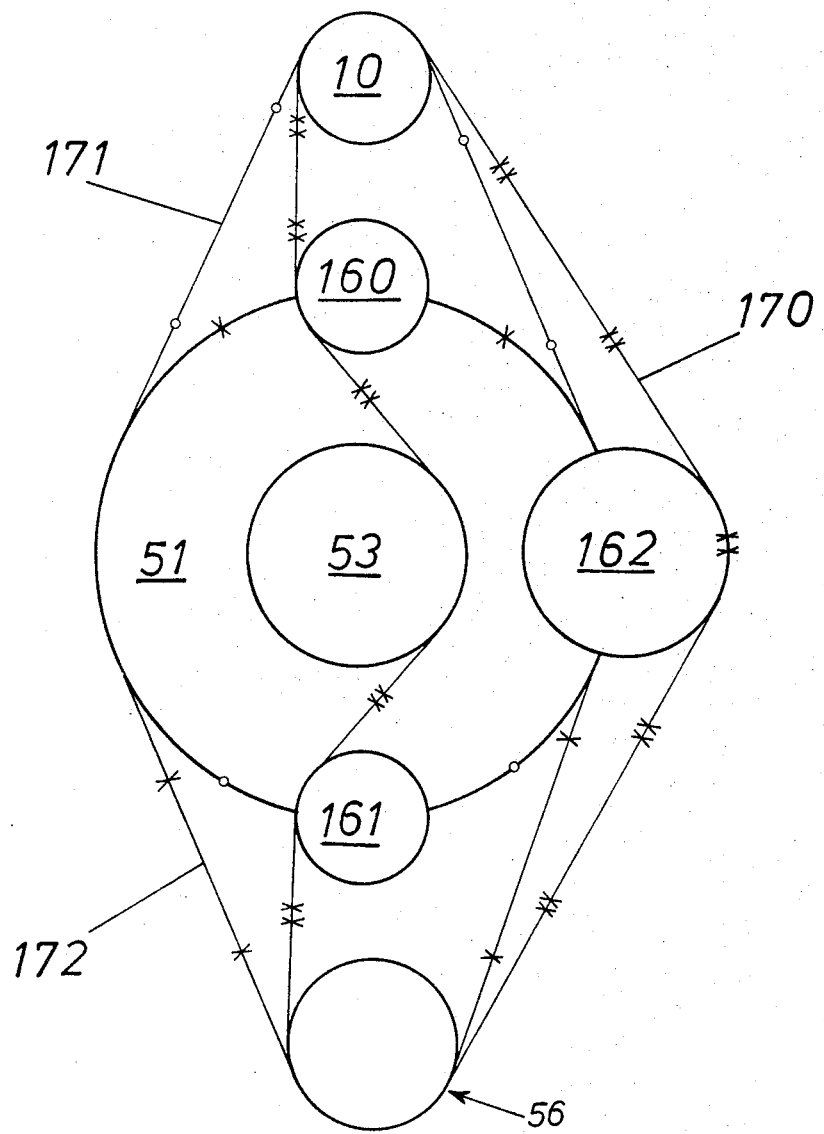
FIG. 4 is a similar view to FIG. 3 showing the layout of the sprocket wheels and interconnecting chains of a further embodiment of the present invention.

With refeence to FIG. 4 there is shown a further embodiment according to the present invention. As in the above described embodiment, the embodiment of FIG. 4 has a first sprocket wheel 51, a second sprocket wheel 53, and an adjustable drive sprocket assembly 10 and a further drive sprocket assembly 56. A chain 171 extends about teeth 11 of sprocket assembly 10 and teeth 48 of the first sprocket wheel 51 and a chain 172 extends about teeth 57 of sprocket assembly 56 and teeth 49 of the first sprocket wheel 51. A further chain 170 extends about teeth 12 of sprocket assembly 10 and teeth 58 of sprocket assembly 56 and also extends about a tensioning sprocket wheel 162, two jockey sprocket wheels 160 and 161 and teeth of the second sprocket wheel 53. Ideally chain 170 is a duplex chain. Jockey wheels 160, 161 are provided so as to provide wrap of chain 170 about the second sprocket wheel 53.

Figure 5:
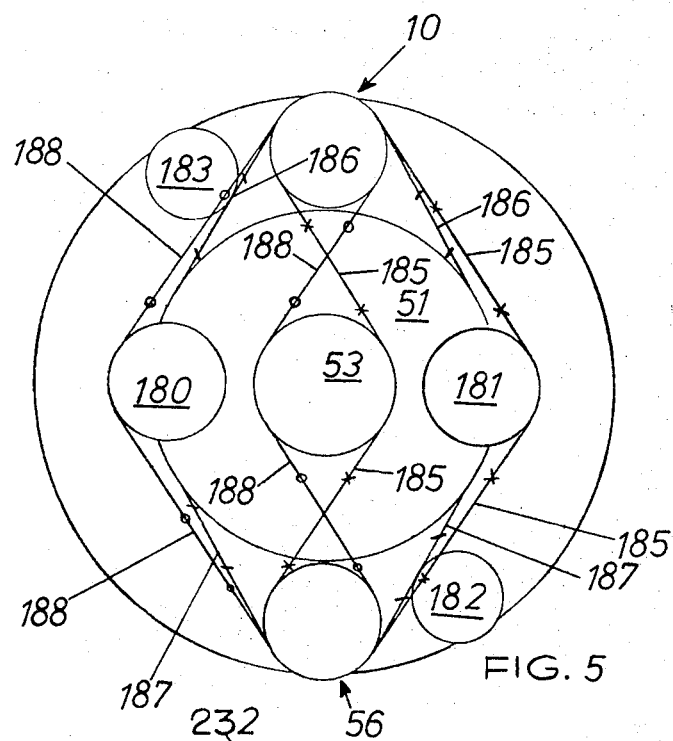
FIG. 5 is a similar view to FIG. 3 showing the layout of the sprocket wheels and interconnecting chains of yet a further embodiment of the present invention.

A further embodiment according to the present invention is illustrated in FIG. 5. As shown in FIG. 5 this embodiment also has two drive sprocket wheel assemblies 10 and 56, a first sprocket wheel 51 and a second sprocket wheel 53. In this embodiment, assemblies 10 and 56 are each provided with three sprocket wheels; the sprocket wheels of the assembly 10 being located in any desired rotational position relative to one another. As with the previously described embodiments a chain 186 extends about teeth 48 on the first sprocket wheel 51 and teeth 11 on the drive sprocket wheel assembly 10 and a chain 187 extends about teeth 49 on first sprocket wheel 51 and 57 of sprocket wheel assembly 56. A chain 185 extends about teeth 12 of drive sprocket assembly 10; and teeth 8 of drive sprocket assembly 56; teeth 46 of sprocket wheel 53 and a sprocket wheel 181 and a chain 188 extends about the teeth of the third sprocket wheel of drive sprocket assemblies 10 and 56, teeth 47 of sprocket wheel 53 and sprocket wheel 180. A tensioning wheel 183 is associated with chain 186 and a tensioning wheel 182 is associated with chain 187. Sprocket wheels 180 and 181 are carried on shaft (not shown) which are located within the casing either in slides or discs as described in connection with the first embodiment so that the position of sprocket wheels 180 and 181 may be adjusted in order to adjust the tension in their associated chain.

The operation of all three embodiments described above is the same. A motor or suitable drive means is connected to the input shaft 54 and suitable means are applied to sleeve 52 in order to control the rotation thereof. The output shaft 53 is connected to any desired apparatus which is to be driven. For a given rotational speed of the input shaft the speed of rotation of the output shaft may be varied from zero to a predetermined maximum speed of the output shaft by a sutiable control of the speed of rotation of sleeve 52. When sleeve 52 is held stationary and not permitted to rotate there is a condition of direct drive through the transmission unit. Thus for a given rotational speed of the input shaft the speed of the output shaft may be greater or less than the speed of rotation of the input shaft in the direct drive condition. Determination of the maximum speed of rotation of the output shaft is suitably achieved by varying the sizes of the different sprocket wheels in the transmission unit. The speed of rotation of the output shaft may be reduced from the given maximum speed to zero by suitably allowing the sleeve 52 to rotate. When there is no restriction on sleeve 52 output shaft 50 does not rotate.

Figure 6:
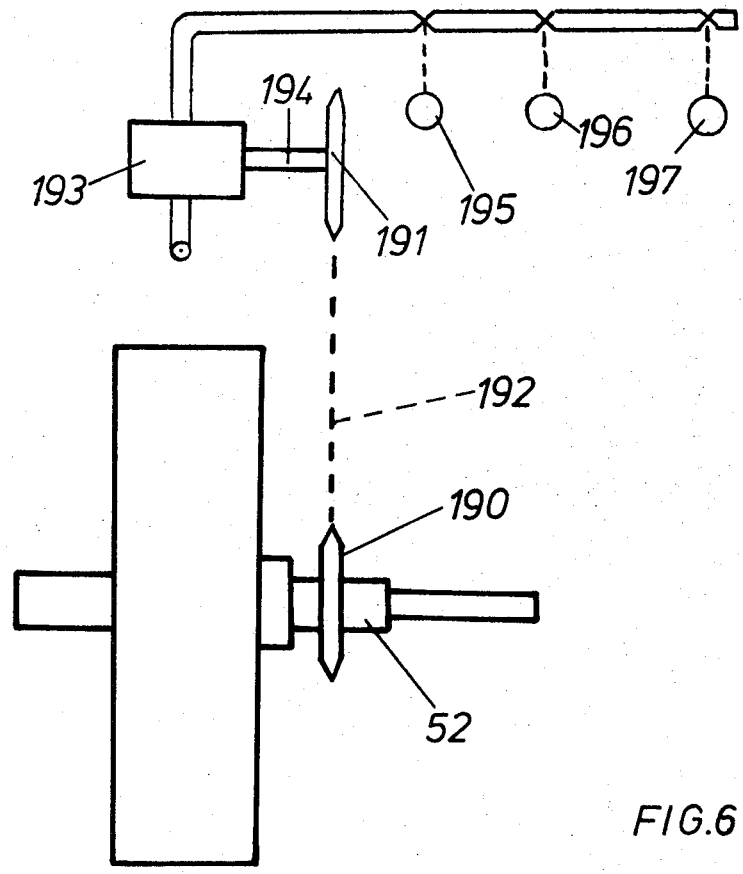
FIG. 6 is a schematic diagram showing controlling means for a transmission unit of the present invention.

With reference to FIG. 6 a transmission unit of the said invention and a suitable control means for controlling the rate of rotation of sleeve 52 is schematically shown. Basically a sprocket wheel 190 is keyed to the sleeve 52 and a chain 192 extends around this sprocket wheel 190 and a sprocket wheel 191 which is keyed to the drive shaft 194 of a hydraulic pump 193. By suitably controlling the fluid output from the pump 193 by means of control valves 195, 196, 197 the speed of rotation of sleeve 52 may be adjusted as desired.

With reference to FIG. 7 the casing 220 is provided with an oil filler plug 219, an oil level plug 202 and an oil drain plug 212 and in use the casing is normally filled to the level of plug 202. Chain 192 passes round the sprocket wheel 190 and the sprocket wheel 191. Valves 195, 196 and 197 are housed in housing 242. The inlet 204 for the hyydraulic pump 192 is located near to the base of casing 220 and is provided with a filter 22. The outlet of the pump 193 is connected through pipe 232 to the control valves housing in housing 242. An outlet pipe 261 from these valves communicates with the interior of casing 220.

Figure 8:
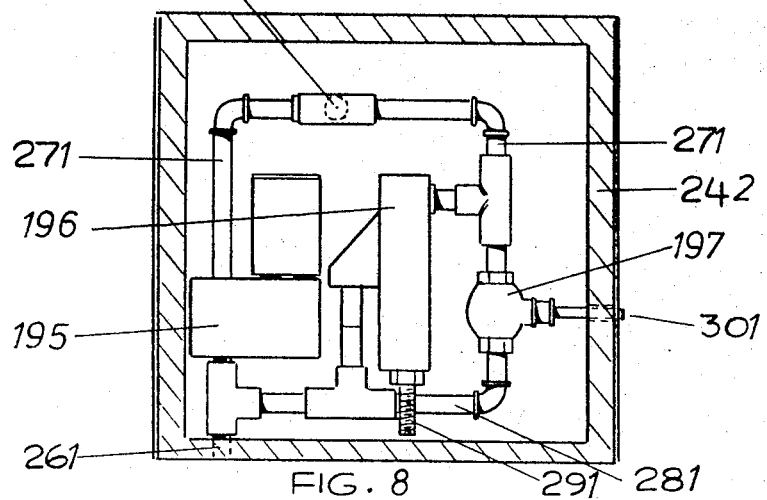
FIG. 8 is a broken away end view of the housing of FIG. 7 as viewed in the direction of arrow D.

Referring now to FIG. 8, which shows the interior of housing 242, the pipe 232 is connected to a solenoid-operated valve 195, to a spring loaded pressure operated volume valve 196 and a hand-controlled trimmer or bypass valve 197 through inlets 271. The valves have outlets 281 communicating with outlet pipe 261.

By suitably controlling operation of valves 195, 196 and 197 it is possible to vary the operation of the transmission unit.

For instance, if valve 197 is shut the output shaft can be made to stop and start at predetermined torque by successive opening and closing valve 195. The torque developed when the valve 195 is closed is determined by pressure valve 196 which will only permit the shaft 194 of the pump to rotate when predetermined fluid pressure is developed in the pump. The valve 196 may be adjusted to be operable at different pressures by suitable adjustment of adjusting screw 291. Such an operation would be useful in a, for example, lathe in winding material at a constant tension onto a spool.

Furthermore, if the output shaft is required to start slowly and gradually increase in speed, valve 197 may be gradually closed from a fully open position to a fully closed position, valve 195 also being closed, against the torque developed being governed by valve 196. Such an operation would be useful for example in a lathe.

Advantageously housing 242 is releasibly retained in casing 202 by a cover plate 251 so that a different housing containing a different arrangement of valves may be connected to the hydraulic pump. For instance, a housing may contain a single valve for instance a sinoidal valve which would enable the transmission unit to be used soley in a "stop/go" type manner.

What is claimed is:

1. A transmission unit having an input shaft, an output shaft in co-axial alignment with the input shaft, a sprocket wheel carrying member secured to the input shaft and extending generally radially therefrom, a first sprocket wheel co-axiallyy mounted on the output shaft, at least one drive sprocket wheel assembly mounted on the sprocket wheel carrying member, each drive sprocket wheel assembly at least including a primary and a secondary sprocket wheel, at least one drive sprocket assembly in which the primary and secondary sprocket wheels are adapted to be releasably locked in a desired rotational position relative to one another, a chain extending about the first sprocket wheel and the primary sprocket wheel of the or each individual drive sprocket wheel assembly, a second sprocket wheel rotatably received on the output shaft, a further chain extending about the second sprocket wheel and the secondary sprocket wheel of the or each individual drive sprocket wheel assembly, and means for controlling the speed of rotation of said second sprocket wheel to control the speed of rotation of said output shaft.

2. A transmission unit in accordance with claim 1 wherein the second sprocket wheel is secured to a sleeve rotatably received on the output shaft and means are provided for controlling the speed of rotation of the sleeve to control the speed of rotation of the output shaft.

3. A transmission unit in accordance with claim 2 wherein the sleeve is adapted to drive a hydraulic pump having a fluid inlet and outlet, the fluid outlet having valve means for controlling the fluid output of the pump to control the speed of rotation of the pump.

4. A transmission unit in accordance with claim 3 wherein the valve means includes a "on/off" valve, a bleed valve and a pressure sensitive valve.

5. A transmission unit in accordance with claim 1 in which there are two drive sprocket wheel assemblies provided in a diametrically opposed relationship about the axis of rotation of the output shaft, and one of the two drive sprocket wheel assemblies is adapted so that the primary and the secondary wheels may be releasably locked in a desired rotational position relative to one another.

6. A transmission unit in accordance with claim 5 in which the second sprocket wheel is secured to a sleeve rotatably received on the output shaft and means are provided for controlling the speed of rotation of the sleeve to control the speed of rotation of the output shaft.

7. A transmission unit in accordance with claim 6 in which the sleeve is adapted to drive a hydraulic pump having a fluit inlet and outlet, the fluid outlet having valve means for controlling the fluid output of the pump to control the speed of rotation of the pump.

8. A transmission unit in accordince with claim 7 in which the valve means includes an "on/off" valve, a bleed valve and a pressure sensitive valve.

9. A transmission unit in accordance with claim 5 in which the claim extending about the second sprocket wheel assembly and the secondary sprocket wheel assembly of a first of said two drive sprocket wheel assemblies also extends about at least a further two separate sprocket wheels each of which is rotatably mounted on said carrying member and the chain extending about the second sprocket wheel and the secondary sprocket wheel of the second of said two drive sprocket wheel assemblies also extends about at least a further two separate sprocket wheels each of which is rotatably mounted on said carrying member.

10. A transmission unit in accordance with claim 5 in which the two drive sprocket wheel assemblies are each provided with primary, secondary and tertiary sprocket wheels and in which a separate chain extends about each primary sprocket wheel and said first sprocket wheel, a first chain extending about the secondary wheel of each drive assembly and about one side of the second sprocket wheel and a second chain extending about the teritary wheel of each drive assembly and about the side of the second sprocket wheel opposite to said one side.

11. A transmission unit in accordance with claim 9 in which the second sprocket wheel is secured to a sleeve rotatably received on the output shaft and means are provided for controlling the speed of rotation of the sleeve to control the speed of rotation of the output shaft.

12. A transmission unit in accordance with claim 11 in which the sleeve is adapted to drive a hydraulic pump having a fluid inlet and outlet, the fluid outlet having valve means for controlling the fluid output of the pump to control the speed of rotation of the pump.

13. A transmission unit in accordance with claim 12 in which the valve means includes a "on/off" valve, a bleed valve and a pressure sensitive valve.

14. A transmission unit in accordance with claim 10 in which the second sprocket wheel is secured to a sleeve rotatably received on the output shaft and means are provided for controlling the speed of rotation of the sleeve to control the speed of rotation of the output shaft.

15. A transmission unit in accordance with claim 14 in which the sleeve is adapted to drive a hydraulic pump having a fluid inlet and outlet, the fluid outlet having valve means for controlling the fluid output of the pump to control the speed of rotation of the pump.

16. A transmission unit in accordance with claim 15 in which the valve means includes a "on/off" valve, a bleed valve and a pressure sensitive valve.

17. A transmission assembly including a casing in which is housed a transmission unit having an input shaft, an output shaft in co-axial alignment with the input shaft, a sprocket wheel carrying member secured to the input shaft and extending generally radially therefrom, a first sprocket wheel co-axially mounted on the output shaft, at least one drive sprocket wheel assembly mounted on the sprocket wheel carrying member, each drive sprocket wheel assembly at least including a primary and a secondary sprocket wheel, at least one drive sprocket assembly in which the primary and secondary sprocket wheels are adapted to be releasably locked in a desired rotational position relative to one another, a chain extending about the first sprocket wheel and the primary sprocket wheel of the or each individual drive sprocket wheel assembly, a second sprocket wheel rotatably received on the output shaft, a further chain extending about the second sprocket wheel and the secondary sprocket wheel of the or each individual drive sprocket wheel assembly, a hydraulic pump also housed in the casing, said second sprocket wheel being in driving connection with said hydraulic pump and valve means for controlling the fluid output of the pump.

18. A transmission assembly in accordance with claim 17 in which the second sprocket wheel is secured to a sleeve rotatably received on the output shaft, the sleeve being in driving connection with the pump.

19. A transmission assembly in accordance with claim 18 in which said sleeve and the input shaft to the pump each carry a sprocket wheel around which extend a chain to provide said driving connection.

* * * * *